United States Patent [19]

Richert

[11] Patent Number: 4,941,355

[45] Date of Patent: Jul. 17, 1990

[54] METHOD AND APPARATUS FOR THE MEASUREMENT OF ACCELERATIONS

[76] Inventor: Hans Richert, Wilhelm-Dresing-Strasse 37, 4600 Dortmund 50, Fed. Rep. of Germany

[21] Appl. No.: 222,274

[22] Filed: Jul. 21, 1988

Related U.S. Application Data

[63] Continuation-in-part of Ser. No. 88,976, Aug. 21, 1987, abandoned, which is a continuation of Ser. No. 893,187, Aug. 5, 1986, abandoned, which is a continuation of Ser. No. 683,569, , abandoned.

[51] Int. Cl.$^5$ .............................................. G01P 15/08
[52] U.S. Cl. .................................................. 73/517 R
[58] Field of Search ................ 73/517 R, 503, 516 R, 73/516 LM; 324/162, 454, 459; 204/421, 426

[56] References Cited

U.S. PATENT DOCUMENTS 3,170,817  2/1965  Mrgudich .......................... 73/517 R
4,188,266  2/1980  Forman ............................... 204/1 R Primary Examiner—John Chapman
Attorney, Agent, or Firm—Toren, McGeady & Associates

[57] ABSTRACT

A method for the measurement of accelerations and an apparatus for performing the method, whereby ions in a solid ion conductor are exposed to the acceleration for generating a measurable voltage. The ion conductor is arranged so that the accelerations are applied along a longitudinal axis thereof. A support structure is arranged around the ion conductor to provide mechanical support therefor. When the acceleration is applied to the ion conductor, the movement of the ions therein generate a voltage across the length of the ion conductor which voltage is supplied, via electrodes at opposing ends of the ion conductor, to a voltage measurement and evaluation device.

6 Claims, 3 Drawing Sheets

METHOD AND APPARATUS FOR THE MEASUREMENT OF ACCELERATIONS

RELATED U.S. APPLICATION DATA

Continuation in part of Ser. No. 088,976, Aug. 21, 1987, now abandoned, which is a continuation of Ser. No. 893,187, Aug. 5, 1986, now abandoned, which was a continuation of Ser. No. 683,569, now abandoned.

BACKGROUND OF THE INVENTION

1. Field of the Invention

The subject invention is directed to a method for measuring accelerations, wherein an ion conductor is subjected to the accelerations, and to an apparatus for performing the method.

2. Description of Related Art

The measurement of accelerations, velocities and rotational speeds is a necessity in a multitude of technical and scientific apparatus. A large number of methods have also been developed for this purpose. These methods are based on a utilization of the inertia of bodies or optical or electrical methods. In particular, during braking or acceleration, the measurement of the developed mechanical forces may be required, which, in part, can be very impractical.

In the case of liquid electrolytes, the possibilities of such acceleration measurements on the basis of ion conductors has already been at least theoretically examined. Thus, for example, in DE-AS 1,086,467 or U.S. Pat. No. 2,735,949, it is explicitly stated that the actual mechanisms are not completely understood. A series of disadvantages are, however, encountered with liquid electrolytes. In particular, in liquid electrolytes, several types of ions are mobile next to each other and, as such, cancel each other out in their effects.

U.S. Pat. No. 3,170,817 to Mrgudich discloses an acceleration measurement device having two amalgamated silver electrodes which are pressed with a slight pressure against a tablet of silver iodide. However, since the electrical voltages, arising on the basis of inertia forces acting on solid ion conductors, are proportional to the length of the ion conductor, if voltages are to be measured, then the tablet shape of the ion conductor cannot be of the shape shown in Mrgudich, i.e. tablet shape, in that it is too thin to lead to reliable results. Only if charges are measured using a charge magnifier, is it possible to utilize area-shaped (tablet) ion conductors, which are accelerated perpendicularly to the surface. In addition, since the electrodes are pressing against the ion conductor, this can lead to falsification and scattering of the measurement signals up to 50%.

SUMMARY OF THE INVENTION

An object of the present invention is to provide a method and apparatus for measuring acceleration using a solid ion conductor, wherein voltages proportional to the acceleration are measured.

This object is achieved by subjecting a rod-shaped ion conductor to the acceleration, in which the ion conductor is arranged to be comparatively thin in cross section while being comparatively long.

It is recognized that thin ion conductors, as a rule, do not themselves have adequate mechanical strength to support the applied acceleration forces. Hence, in the subject invention, the solid ion conductors are provided with a mechanically tough support framework or solid ion conductors are used which are in fact able to carry the applied loads.

With mechanically tough materials, the support matrix or framework can, for example, consist of aluminum oxide, wherein the support framework can be lattice-shaped, star-shaped, or constructed of a sponge-like structure having a plurality of cavities into which the ion conductor is introduced, the cavities being interconnected with each other in order to be able to measure ion displacement.

If the carrier or support matrix consists of ceramic, then the solid ion conductors can, for example, be vapor deposited or applied through printing by the screen printing technology. The so-called CVD method (chemical-vapor-deposition) can also be used.

While it is known that the inertia forces of electrons under similar stresses can be measured in metals, these electrons can only generate a very weak electrical signal due to their small mass. Hence, measurement instruments on this basis are not practical. Ions, as for example, silver ions, which have a high mobility in a silver ion conductor, have, as compared to electrons, an approximately $2 \times 10^5$ times larger mass and result, during acceleration or braking of the ion conductor, in $2 \times 10^5$ times stronger electrical signals, meaning $2 \times 10^5$ times higher voltages at otherwise equal geometry of the conductor.

In the case of hard or tough ion conductors no support framework is needed. In this case, $\beta$-aluminum oxide or doped zirconium dioxide may be used. In $\beta$-aluminum oxide, the mobile ions are normally sodium ions. Since, however, the acceleration voltages are proportional to the mass of the moved ions, it is more desirable to replace the sodium ions by silver ions or other heavy ones in the $\beta$-aluminum oxide.

In the subject invention, the electrodes are solidly anchored directly with the hard base support or through the ion conductor as an intermediate layer, so that they are no longer exposed to any pressure. If self-supporting hard or tough ion conductors are used, then the electrodes can be also applied on the side at the ends of the ion conductors, wherein the electrodes and the ion conductors are appropriately connected by splines with each other, possibly in such a way that a transitional layer is provided between the ion conductors and the electrodes, which intermediate layer consists of a mixture of the electrode as well as ion conductor materials.

BRIEF DESCRIPTION OF THE DRAWINGS

With the above and additional objects and advantages in mind as will hereinafter appear, the subject invention will be described with reference to the accompanying drawings, in which.

DESCRIPTION OF THE PREFERRED EMBODIMENTS

Figure 1:
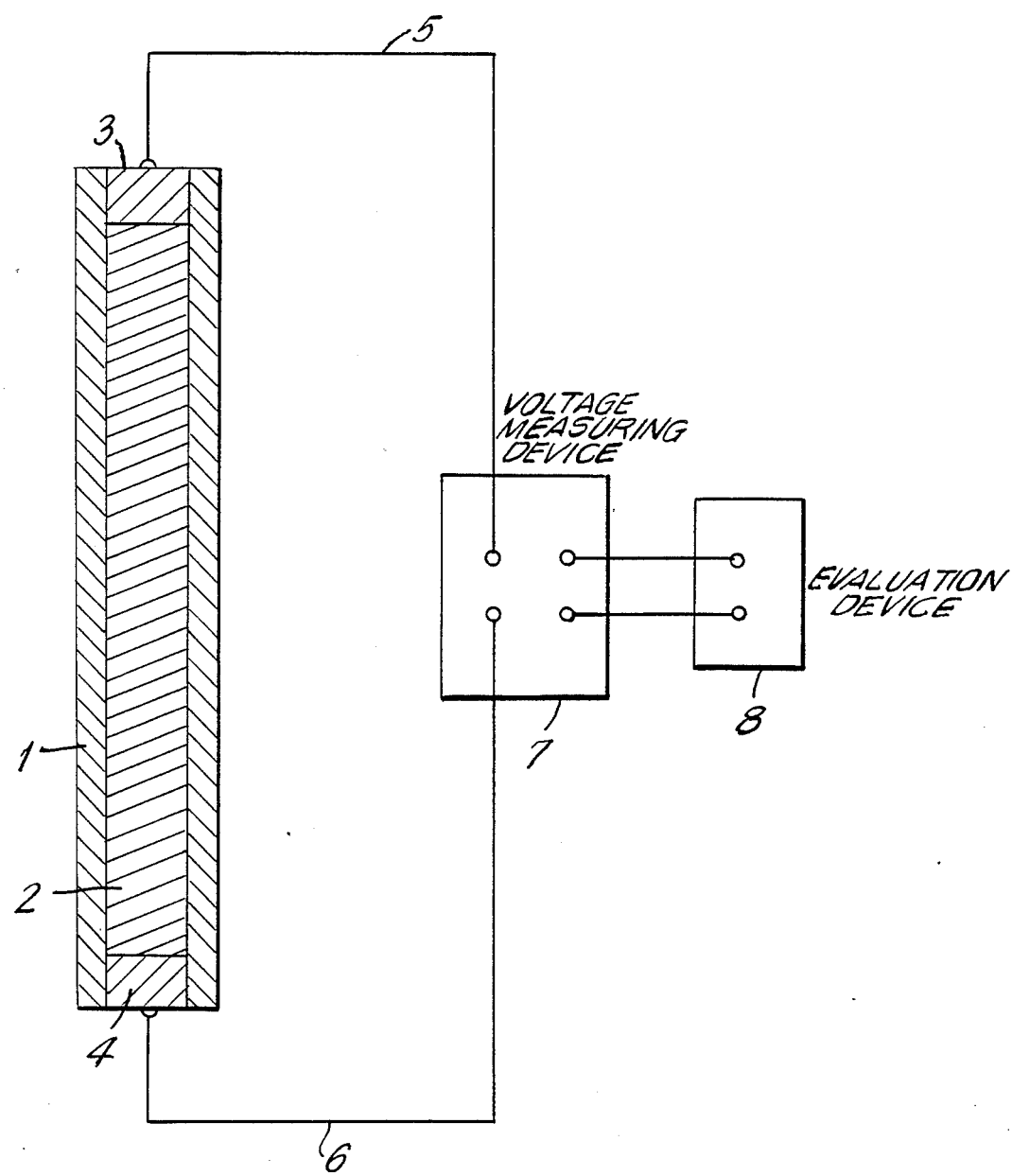
FIG. 1 shows a schematic diagram of the principle of the invention.

In FIG. 1, a rigid hollow column 1 is shown within which is arranged an ion conductor 2. Conductive electrodes 3 and 4, for example silver, are arranged at the ends of the column 1 in contact with the ion conductor 2. Feed conductors 5 and 6 connect the electrodes 3 and 4 with a voltage measuring device 7, which may then be connected to an evaluation instrument 8 for converting the measured voltage to, for example, a rate of acceleration.

There are various materials which may be used for the ion conductor 2, depending on the environment in which the apparatus is to be used. In particular, when measurements are to be made at low or room temperature or at temperatures up to several hundred degrees C., the ion conductor 2 may be made of silver, copper, lithium or sodium ion conducting compound, for example, silver rubidium iodide, lithium nitride, $\beta$-Eucryptid, $\beta$-aluminum oxide, silver iodide tungstate, silver iodide phosphate or borate glasses; for high temperatures in excess of approximately 500° C. the ion conductor may be zirconium dioxide or thorium dioxide.

Figure 2:
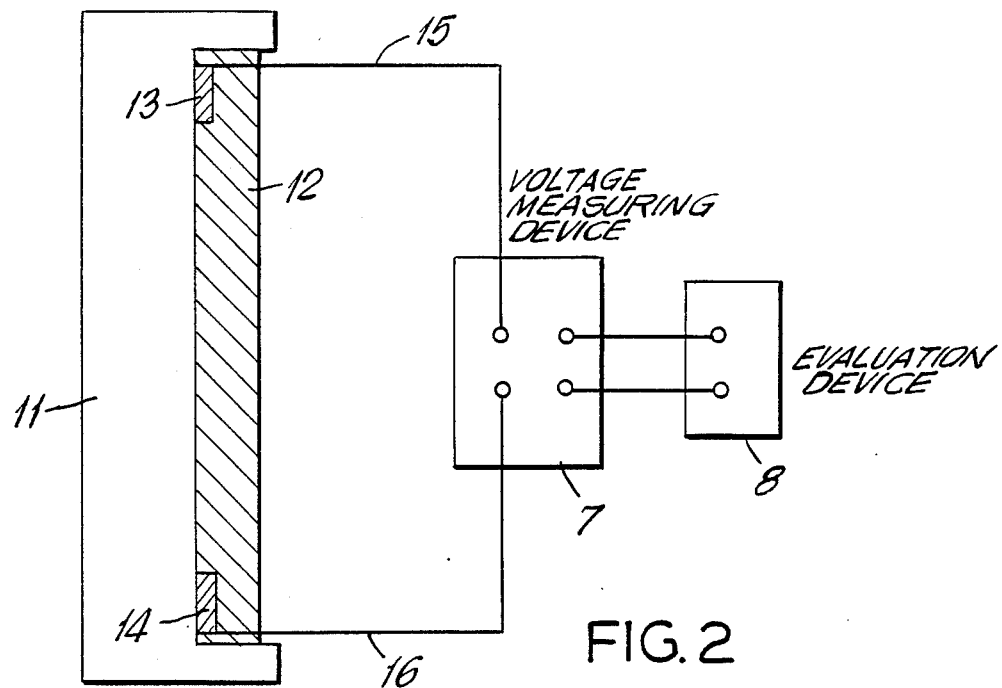
FIG. 2 shows an alternate embodiment of the arrangement of the ion conductor and a support structure therefor.

FIG. 2 shows an alternate embodiment of the support structure for the ion conductor. In particular, the support frame 11 is arranged in a "C" shape in cross section. The ion conductor 12 is then arranged between the ends of the C-shaped support frame 11. the electrodes 13 and 14 are shown sandwiched between the ion conductor 12 and the back of the C-shaped support frame 11 near the opposing ends thereof. Feed conductors 15 and 16 respectively connect the electrodes 13 and 14 to the voltage measuring device 7.

Figure 3:
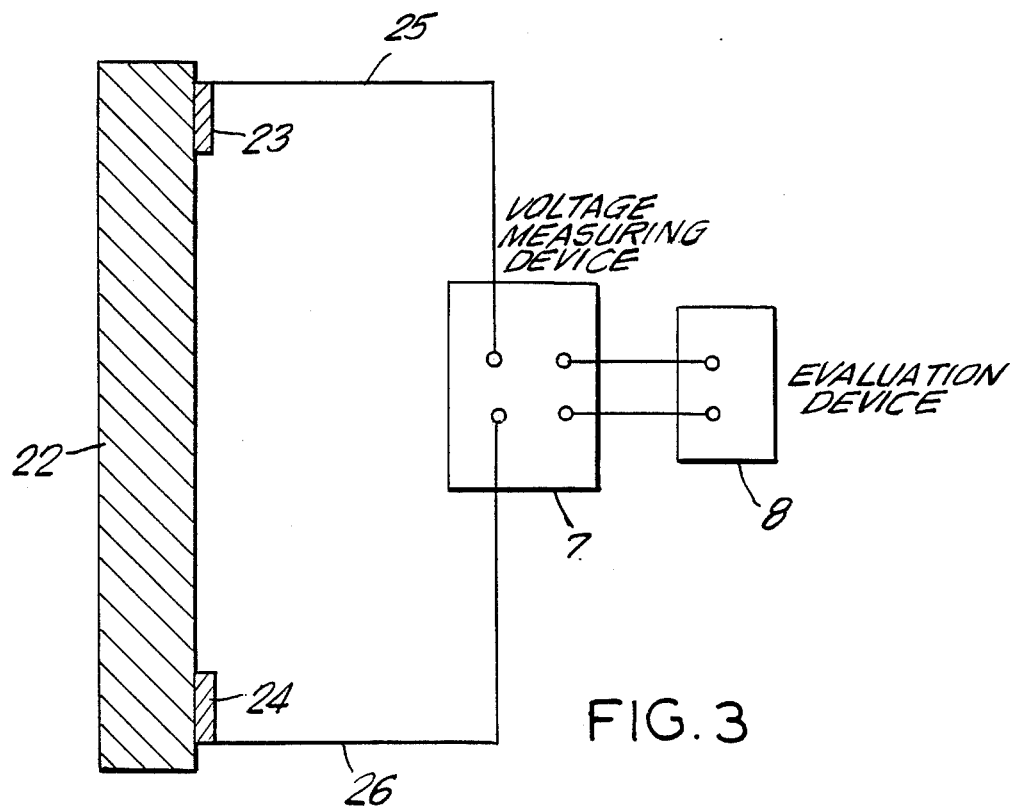
FIG. 3 shows an embodiment of the invention having a mechanically tough ion conductor.

FIG. 3 shows an embodiment in which the ion conductor 22 is made of a mechanically tough material, for example, $\beta$-aluminum oxide or doped zirconium dioxide. Electrodes 23 and 24 are attached to a side of the ion conductor 22 near opposing ends thereof. Feed conductors 25 and 26 respectively connect the electrodes 23 and 24 to the voltage measuring device 7.

Figure 4:
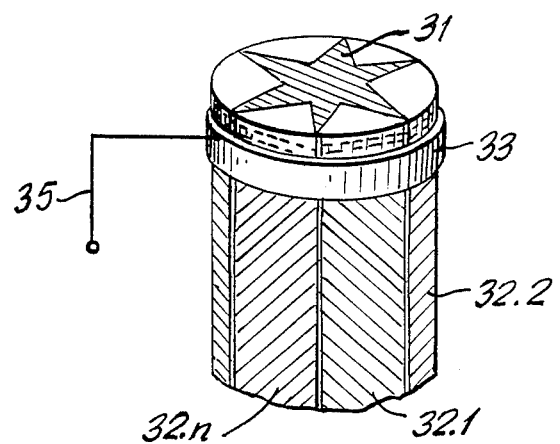
FIG. 4 shows a further alternate embodiment of the arrangement of the ion conductor surrounding a support structure therefor.

FIG. 4 shows an alternate embodiment of the support structure for the ion conductor. In particular, the support frame 31 is arranged in a star shape in cross section. Multiple ion conductors 32.1, 32.2, . . . , 32.n are then arranged around the support frame 31 between the points of the star shape. An electrode 33 is shown as a band surrounding the ion conductors 32.n and the frame 31; a similar electrode (not shown) is arranged at the other end of the ion conductors 32.n. Feed conductor 35 then connects the electrode 33 to the voltage measuring device 7.

Figure 5:
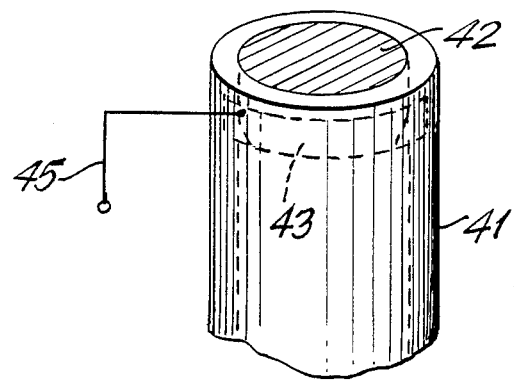
FIG. 5 shows another embodiment of an arrangement of the ion conductor within a support structure.

FIG. 5 shows a further alternate embodiment of the support structure for the ion conductor. The support frame is arranged as a cylindrical tube 41 within which an ion conductor 42 is positioned. Between the inner surface of the tube 41 and the ion conductor 42 at one end thereof is arranged an electrode 43. Again a similar electrode (not shown) is arranged at the other end of the ion conductor 42. A feed conductor 45 then connects the electrodes 43 to the voltage measuring device 7.

Numerous alterations of the structure herein disclosed will suggest themselves to those skilled in the art. However, it is to be understood that the present embodiments are for purposes of illustration only and not to be construed as limitations of the invention. All such modifications which do not depart from the spirit of the invention are intended to be included within the scope of the appended claims.

I claim:

1. An apparatus for measuring accelerations, comprising:
    a solid ion conductor to which an acceleration is applied along a longitudinal axis thereof, wherein a length of said ion conductor is at least a multiple of a cross-sectional extent thereof;
    electrodes in contact with said ion conductor at opposite ends thereof;
    a device connected to said electrodes for measuring and evaluating a voltage generated in said ion conductor; and
    a mechanically tough frame for physically supporting the ion conductor.

2. An apparatus according to claim 1, wherein said frame is star-shaped.

3. An apparatus according to claim 1 or 2, wherein the ion conductor is vapor-deposited or printed on the support frame using screen print technology or the chemical-vapor-deposition method.

4. An apparatus according to claim 1, wherein the ion conductor is an elongated solid ion conductor.

5. A method for measuring accelerations at low temperatures, room temperatures and temperatures up to several hundred degrees C., comprising the steps of:
    forming at least one solid ion conductor from silver rubidium iodide, lithium nitride, $\beta$-Eucryptid, $\beta$-aluminum oxide, silver iodide tungstate, silver iodide phosphate or borate glasses;
    arranging the ion conductor in or about a mechanically tough support framework;
    subjecting the at least one solid ion conductor to an acceleration along a longitudinal axis thereof so as to move ions therein;
    tapping off voltages generated in the ion conductor due to the movement of ions therein through electrodes arranged substantially at opposing ends of the ion conductor; and
    applying the generated voltage to a voltage measurement and evaluation unit for further processing.

6. A method for measuring accelerations at temperatures exceeding 500° C., comprising the steps of:
    forming at least one solid ion conductor from zirconium dioxide, thorium dioxide or calcium fluoride;
    arranging the ion conductor in or about a mechanically tough support framework;
    subjecting the at least one solid ion conductor to an acceleration along a longitudinal axis thereof so as to move ions therein;
    tapping off voltages generated by the ion conductor due to movement of ions therein through electrodes arranged substantially at opposing ends of the ion conductor; and
    applying the generated voltage to a voltage measurement and evaluation unit for further processing.

* * * * *